(12) United States Patent
Dreier et al.

(10) Patent No.: US 6,540,794 B1
(45) Date of Patent: Apr. 1, 2003

(54) AZO DYES, A PROCESS FOR THEIR PREPARATION AND THEIR USE IN THE DYEING OR PRINTING OF HYDROPHOBIC FIBER MATERIALS

(75) Inventors: Romeo Dreier, Fehren (CH); Jean-Claude Wilhelm, Knoeringue (FR); Alfons Arquint, Basel (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 106 days.

(21) Appl. No.: 09/664,906

(22) Filed: Sep. 18, 2000

(30) Foreign Application Priority Data

Sep. 20, 1999 (EP) .............................................. 99810836

(51) Int. Cl.[7] ........................ C09B 29/085; C09B 29/01; D06P 1/16; D06P 3/42; D06P 3/36
(52) U.S. Cl. .................................... 8/662; 8/922; 8/921
(58) Field of Search ........................... 8/662, 921, 922; 534/843, 856, 850

(56) References Cited

U.S. PATENT DOCUMENTS

| | | | |
|---|---|---|---|
| 2,891,942 A | 6/1959 | Merian | 260/207.1 |
| 2,941,992 A | 6/1960 | Rhyner et al. | 260/205 |
| 3,207,568 A | 9/1965 | Lerch | 8/26 |
| 3,342,804 A | 9/1967 | Mueller | 260/207.1 |
| 3,407,189 A | 10/1968 | Merian | 260/207.1 |

FOREIGN PATENT DOCUMENTS

| | | |
|---|---|---|
| GB | 1445071 | 8/1976 |
| JP | 49 30417 | 3/1974 |

OTHER PUBLICATIONS

Chemical Abstract vol. 82, (1975) 30/06 No. 26 of JP 002129891, 172578d, Mar. 1974.
E. Hoyer et al. "Sterische Hinderung" Angewandte Chemie, Bd. 85, Nr. 22, Jan. 1973 pp. 984–985, XP 002129890.

*Primary Examiner*—Margaret Einsmann
(74) *Attorney, Agent, or Firm*—Kevin T. Mansfield

(57) ABSTRACT

The present invention relates to dyes of formula

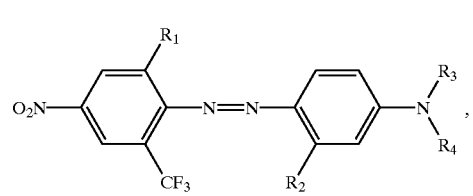

(1)

wherein
$R_1$ is hydrogen, bromine, chlorine, cyano, $R_2$ is hydrogen, methyl, acetylamino, $R_3$ is ethyl unsubstituted or substituted by cyano or by acyloxy, $R_4$ is ethyl unsubstituted or substituted by cyano or by acyloxy, to a process for their preparation and to their use in the dyeing or printing of hydrophobic fiber materials.

3 Claims, No Drawings

AZO DYES, A PROCESS FOR THEIR PREPARATION AND THEIR USE IN THE DYEING OR PRINTING OF HYDROPHOBIC FIBER MATERIALS

The present invention relates to azo dyes, to their preparation and to their use in the dyeing or printing of semi-synthetic or synthetic hydrophobic fibre materials.

Azo dyes and their use in the dyeing of semi-synthetic or synthetic hydrophobic fibre materials are known. It has been shown, however, that such dyes do not always fully satisfy the highest demands, especially in respect of high temperature light fastness and/or colour strength. There is therefore a need for new dyes that yield tinctorially strong dyeings or prints having high temperature light fastness and that exhibit good allround fastness properties.

It has now been found, surprisingly, that the dyes according to the invention meet the criteria given above to a considerable degree.

The present invention accordingly relates to dyes of formula

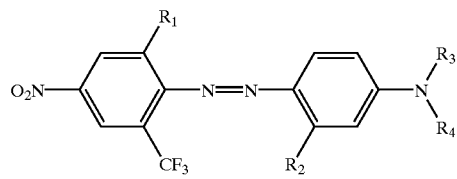

(1)

wherein $R_1$ is hydrogen, bromine, chlorine, cyano, $R_2$ is hydrogen, methyl, acetylamino, $R_3$ is ethyl unsubstituted or substituted by cyano or by acyloxy, $R_4$ is ethyl unsubstituted or substituted by cyano or by acyloxy.

$R_1$ is preferably bromine or cyano.

$R_2$ is preferably hydrogen or acetylamino. $R_2$ is more especially hydrogen.

$R_3$ is preferably cyanoethyl.

$R_4$ is preferably cyanoethyl.

Special preference is given to the dyes of formulae

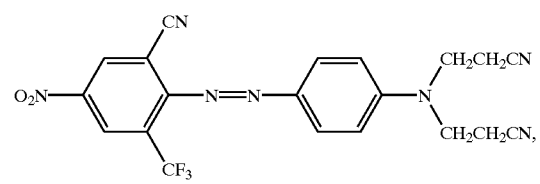

(100)

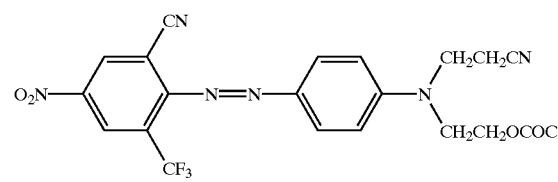

(101)

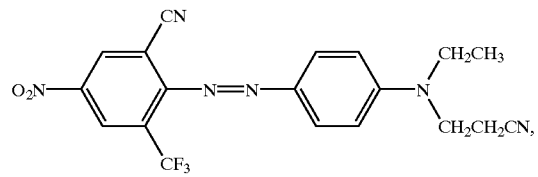

(102)

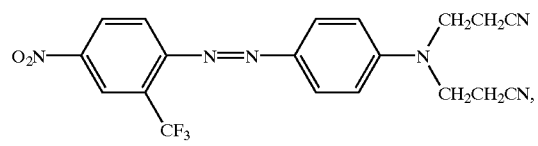

(103)

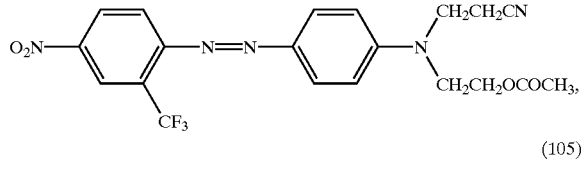

(104)

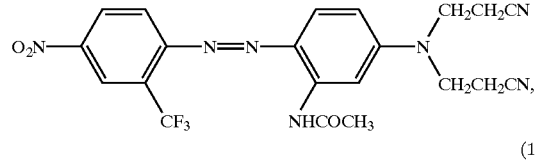

(105)

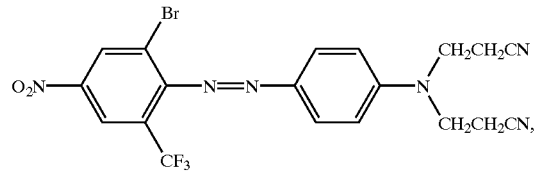

(106)

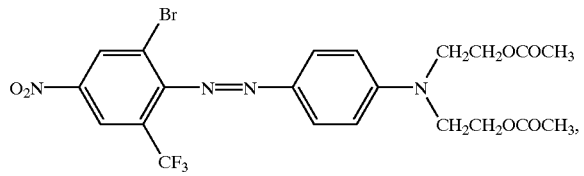

(107)

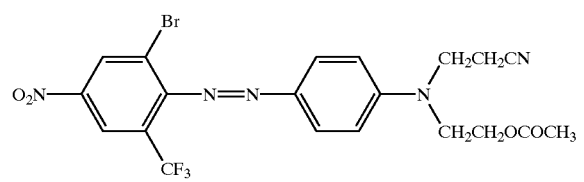

(108)

and

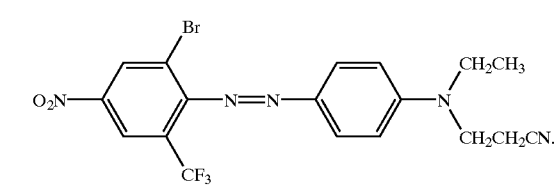

(109)

The present invention relates also to the process for the preparation of the dyes of formula (1) according to the invention The dyes are prepared, for example, as follows: a compound of formula

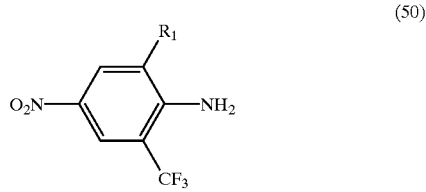

(50)

is diazotised in accordance with a customary procedure and then coupled to a coupling component of formula

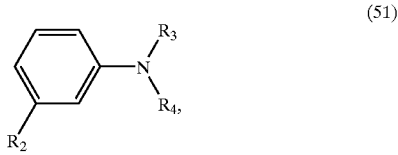

(51)

$R_1$, $R_2$, $R_3$ and $R_4$ being as defined above.

The diazotisation of the compound of formula (50) is carried out in a manner known per se, for example with sodium nitrite in an acidic, e.g. hydrochloric-acid-containing or sulfuric-acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid or hydrochloric acid or a mixture of such acids, e.g. a mixture of propionic acid and acetic acid. The diazotisation is advantageously carried out at temperatures of from −10 to 30° C., for example from −10° C. to room temperature.

The coupling of the diazotised compound of formula (50) to the coupling component of formula (51) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The compounds of formula (50) are known or can be prepared in a manner known per se. The coupling components of formula (51) are known or can be prepared in a manner known per se.

The dyes according to the invention can be used in the dyeing and printing of semi-synthetic and, especially, synthetic hydrophobic fibre materials, more especially textile materials. Textile materials composed of blends that contain such semi-synthetic and/or synthetic hydrophobic textile materials can likewise be dyed or printed using the dyes according to the invention.

Semi-synthetic textile materials that come into consideration are especially cellulose secondary acetate and cellulose triacetate. Synthetic hydrophobic textile materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the dyes according to the invention to the textile materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose secondary acetate is dyed preferably at about from 65 to 85° C. and cellulose triacetate at temperatures of up to 115° C.

The dyes according to the invention will not stain wool and cotton present at the same time in the dyebath or will stain such materials only slightly (very good reservation), so that they can also be used satisfactorily in the dyeing of polyester/wool and polyester/cellulose fibre blend fabrics.

The dyes according to the invention are suitable for dyeing in accordance with the thermosol process, in the exhaust and continuous process and for printing processes. The exhaust process is preferred. The liquor ratio is dependent upon the nature of the apparatus, the substrate and the form of make-up. It may, however, be selected within a wide range, e.g. from 1:4 to 1:100, but is preferably from 1:6 to 1:25.

The said textile material can be in a variety of processing forms, e.g. in the form of fibres, yarns or non-wovens and in the form of woven fabrics or knitted fabrics.

It is advantageous to convert the dyes according to the invention into a dye preparation prior to use. For this purpose, the dyes are ground so that their particle size is on average from 0.1 to 10 microns. The grinding can be carried out in the presence of dispersants. For example, the dried dye is ground with a dispersant or is kneaded in paste form with a dispersant and then dried in vacuo or by atomisation. The preparations so obtained can be used, after the addition of water, to prepare printing pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The dyes according to the invention impart to the mentioned materials, especially to polyester material, level colour shades having very good in-use fastness properties, such as, especially, good fastness to light, more especially very good high temperature light fastness, fastness to thermofixing, to pleating, to chlorine and to wetting, such as fastness to water, perspiration and washing; the finished dyeings are also distinguished by good fastness to rubbing.

The dyes according to the invention can also be used satisfactorily in the preparation of mixed shades together with other dyes. The dyes according to the invention can be used especially as a suitable component in a trichromatic dyeing or printing technique.

The dyes according to the invention are also very suitable for dyeing hydrophobic textile material from supercritical $CO_2$.

The present invention relates also to the above-mentioned use of the dyes according to the invention as well as to a process for the dyeing or printing of semi-synthetic or synthetic hydrophobic fibre material, especially textile material, which process comprises applying the dyes according to the invention to the said material or incorporating them into the material. The said hydrophobic fibre material is preferably textile polyester material. Further substrates that can be treated by the process according to the invention and preferred process conditions can be found above in the detailed description of the use of the dyes according to the invention.

The invention relates also to the hydrophobic fibre material, especially polyester textile material, dyed or printed by the said process.

The dyes according to the invention are also suitable for modern reproduction processes, e.g. thermotransfer printing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

EXAMPLE 1

A. In a laboratory reaction apparatus, 103.0 g of 2-amino-5-nitrobenzene trifluoride are dissolved in 625 ml of methanol at room temperature. 95.9 g of bromine in 250 ml of methanol are then added dropwise to the resulting solution in the course of 2 hours and the reaction mixture is stirred at room temperature for a further 24 hours. The pH value is then adjusted to 7–8 with 64 ml of a 30% aqueous NaOH solution; the mixture is diluted with 600 ml of water and the precipitated product is filtered off with suction, washed with water and dried in vacuo at 60° C. 126.4 g of the compound of formula

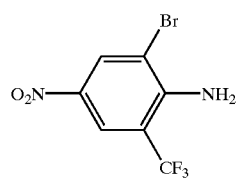

(50a)

are obtained.

B. In a laboratory reaction apparatus, 57.0 g of the compound of formula (50a) are stirred into 100 g of 97% sulfuric acid in the course of 30 minutes at a temperature of 20–30° C. and then cooled to 0° C. 65.0 g of a 40% nitrosylsulfuric acid solution are then added to the reaction mass in the course of 30 minutes at a temperature of from 0 to 5° C. and stirred with a slight nitrite excess for 5 hours. When the reaction is complete, the nitrite excess is eliminated by stirring for 15 minutes with sulfamic acid.

C. 39.8 g of N,N-bis(2-cyanoethyl)aniline are dissolved in 500 g of 80% acetic acid for 1 hour at elevated temperature. The solution is then cooled to 5° C. by the addition of 50 g of ice. The diazotisation mass prepared under B. is then added to the resulting reaction mixture in the course of 15 minutes at a temperature of from 0 to 5° C. The resulting rise in temperature is corrected by the addition of about 200 g of ice. When the addition is complete, the reaction mixture is stirred for a further 3 hours. The resulting azo dye is then precipitated with water, filtered off, washed repeatedly with water and dried. 96.0 g of the dye of formula

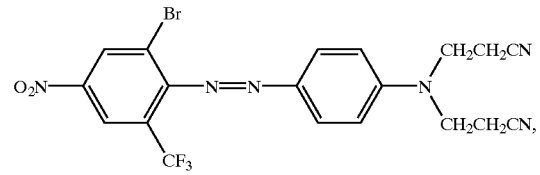

(106)

which dyes polyester a brilliant orange shade, are obtained.

D. 20.4 g of the dye of formula (106) and 300 ml of 1-methyl-2-pyrrolidone are introduced into a laboratory reaction apparatus and stirred at room temperature for 22 hours. The temperature is then raised to 40° C. and the mixture is stirred for a further 2 hours. 3.6 g of CuCN are added to the resulting solution at room temperature. The mixture is stirred for 4 hours, then 45 ml of water are added dropwise and the mixture is stirred for a further 30 minutes. The precipitated dye is then filtered off with suction, washed neutral with water, a 15% aqueous $NH_3$ solution and again with water and dried. 16.0 g of the dye of formula

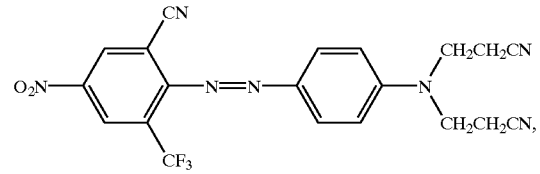

(100)

which dyes polyester a brilliant red shade, are obtained.

EXAMPLES 2–20

The following dyes listed in Table 1 can be prepared analogously to the processes described in Example 1:

TABLE 1

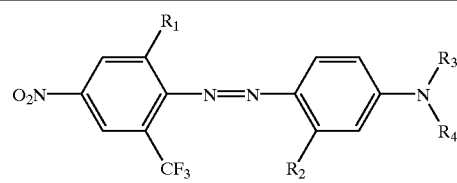

| Example No. | $R_1$ | $R_2$ | $R_3$ | $R_4$ |
|---|---|---|---|---|
| 2 | —CN | —H | —$CH_2CH_3$ | —$CH_2CH_2CN$ |
| 3 | —CN | —H | —$CH_2CH_2CN$ | —$CH_2CH_2OCOCH_3$ |
| 4 | —CN | —$NHCOCH_3$ | —$CH_2CH_2CN$ | —$CH_2CH_2CN$ |
| 5 | —CN | —H | —$CH_2CH_2OCOCH_3$ | —$CH_2CH_2OCOCH_3$ |
| 6 | —CN | —H | —$CH_2CH_3$ | —$CH_2CH_2OCOCH_3$ |
| 7 | —Br | —H | —$CH_2CH_3$ | —$CH_2CH_2CN$ |
| 8 | —Br | —H | —$CH_2CH_2CN$ | —$CH_2CH_2OCOCH_3$ |
| 9 | —Cl | —$CH_3$ | —$CH_2CH_2CN$ | —$CH_2CH_2CN$ |
| 10 | —Br | —H | —$CH_2CH_2OCOCH_3$ | —$CH_2CH_2OCOCH_3$ |

TABLE 1-continued

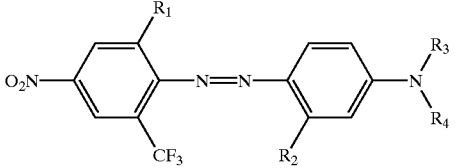

| Example No. | $R_1$ | $R_2$ | $R_3$ | $R_4$ |
|---|---|---|---|---|
| 11 | —Br | —H | —CH$_2$CH$_3$ | —CH$_2$CH$_2$OCOCH$_3$ |
| 12 | —H | —NHCOCH$_3$ | —CH$_2$CH$_2$CN | —CH$_2$CH$_2$CN |
| 13 | —H | —H | —CH$_2$CH$_2$CN | —CH$_2$CH$_2$CN |
| 14 | —H | —H | —CH$_2$CH$_2$CN | —CH$_2$CH$_2$OCOCH$_3$ |
| 15 | —H | —H | —CH$_2$CH$_3$ | —CH$_2$CH$_2$CN |
| 16 | —H | —H | —CH$_2$CH$_3$ | —CH$_2$CH$_2$OCOCH$_3$ |
| 17 | —Br | —CH$_3$ | —CH$_2$CH$_2$CN | —CH$_2$CH$_2$CN |
| 18 | —CN | —CH$_3$ | —CH$_2$CH$_2$CN | —CH$_2$CH$_2$CN |
| 19 | —Cl | —H | —CH$_2$CH$_2$CN | —CH$_2$CH$_2$CN |
| 20 | —H | —CH$_3$ | —CH$_2$CH$_2$CN | —CH$_2$CH$_2$CN |

What is claimed is:

1. A dye of formula

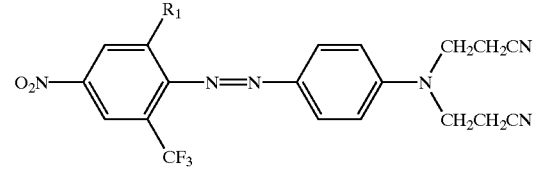

(1a)

wherein $R_1$ is bromo or cyano.

2. A semi-synthetic or synthetic hydrophobic fibre material dyed or printed with a dye of formula (1) according to claim 1.

3. A method of dyeing or printing of semi-synthetic or synthetic hydrophobic fibre materials, which comprises contacting said fibre materials with a dye of formula (1) according to claim 1.

* * * * *